United States Patent
Wu

(10) Patent No.: US 10,575,349 B2
(45) Date of Patent: *Feb. 25, 2020

(54) DEVICE AND METHOD FOR HANDLING A NEW RADIO CONNECTION IN INTER-SYSTEM MOBILITY

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/861,685

(22) Filed: Jan. 4, 2018

(65) Prior Publication Data
US 2018/0192455 A1    Jul. 5, 2018

Related U.S. Application Data

(60) Provisional application No. 62/442,379, filed on Jan. 4, 2017, provisional application No. 62/442,384, filed on Jan. 4, 2017.

(51) Int. Cl.
*H04W 8/08* (2009.01)
*H04W 72/04* (2009.01)
(Continued)

(52) U.S. Cl.
CPC .............. *H04W 76/11* (2018.02); *H04W 8/08* (2013.01); *H04W 28/0268* (2013.01);
(Continued)

(58) Field of Classification Search
None
See application file for complete search history.

(56) References Cited

U.S. PATENT DOCUMENTS

2011/0111758 A1* 5/2011 Liu .................. H04W 8/18
455/435.2
2018/0192334 A1* 7/2018 Wu .................. H04W 36/0033

FOREIGN PATENT DOCUMENTS

CN       103385022 A    11/2013
CN       105282803 A     1/2016
(Continued)

OTHER PUBLICATIONS

3GPP TR 23.799 V14.0.0 (Dec. 2016) Technical Report, 3rd Generation Partnership Project; Technical Specification Group Services and System Aspects; Study on Architecture for Next Generation System (Release 14), Dec. 2016.
Office action dated Jan. 31, 2019 for the Taiwan application No. 107100283, filed Jan. 4, 2018, pp. 1-6.
Search Report dated Jun. 8, 2018 for EP application No. 18150246.9, pp. 1-5.
(Continued)

*Primary Examiner* — Angel T Brockman
(74) *Attorney, Agent, or Firm* — Winston Hsu

(57) ABSTRACT

A new radio (NR) network for handling mobility for a communication device from the NR radio network to a LTE network comprises a storage device for storing instructions and a processing circuit coupled to the storage device. The processing circuit is configured to execute the instructions stored in the storage device. The instructions comprise connecting to the communication device; communicating a NR connection identity (ID) identifying a NR connection with the communication device; communicating data of the NR connection with the communication device; receiving a context request message for the communication device from the LTE network; and transmitting a context response message comprising an evolved packet system (EPS) bearer context of the communication device to the LTE network, wherein the EPS bearer context comprises an EPS bearer identity and a first plurality of quality-of-service (QoS) parameters.

14 Claims, 8 Drawing Sheets

(51) Int. Cl.
H04W 76/11 (2018.01)
H04W 36/00 (2009.01)
H04W 28/02 (2009.01)

(52) U.S. Cl.
CPC ... *H04W 36/0033* (2013.01); *H04W 72/0413* (2013.01); *H04J 2211/005* (2013.01)

(56) References Cited

FOREIGN PATENT DOCUMENTS

| | | |
|---|---|---|
| CN | 106165488 A | 11/2016 |
| CN | 106231637 A | 12/2016 |
| JP | 2013-81041 A | 5/2013 |
| JP | 2014057379 | 3/2014 |

OTHER PUBLICATIONS

Ericsson, "Scenarios for inter-RAT inter-working", 3GPP TSG-RAN WG2 #96, Tdoc R2-168294, Nov. 14-18, 2016, Reno, Nevada, USA, XP051177944, pp. 1-5.
Huawei, HiSilicon, "Discussion on LTE-NR handover", 3GPP TSG-RAN WG2 Meeting #96, R2-168570, Nov. 14-18, 2016, Reno, Nevada, USA, XP051178145, pp. 1-3.
Huawei, "Procedure of inter-RAT handover without CN change", 3GPP TSG-RAN WG3 Meeting #94, R3-162952, Nov. 14-18, 2016, Reno, Nevada, USA, XP051179052, pp. 1-3.
Office action dated Nov. 27, 2019 for the China application No. 201810008432.5, filed Jan. 4, 2018, p. 1-8.
Ericsson, "UE context handling during inter RAT handover", 3GPP TSG-RAN WG2 #96, Tdoc R2-168302, Nov. 14-18, 2016, Reno, Nevada, USA, XP051177952, pp. 1-3.

* cited by examiner

US 10,575,349 B2

DEVICE AND METHOD FOR HANDLING A NEW RADIO CONNECTION IN INTER-SYSTEM MOBILITY

CROSS REFERENCE TO RELATED APPLICATIONS

This application claims the benefit of U.S. Provisional Applications No. 62/442,379 filed on Jan. 4, 2017 and U.S. Provisional No. 62/442,384 on Jan. 4, 2017, which are incorporated herein by reference.

BACKGROUND OF THE INVENTION

1. Field of the Invention

The present invention relates to a device and a method used in a wireless communication system, and more particularly, to a device and a method of handling a new radio (NR) connection in inter-system mobility in a wireless communication system.

2. Description of the Prior Art

The Third Generation Partnership Project (3GPP) recently starts developing a next generation cellular system called a new radio (NR) system or a next generation (NextGen) system. To provide seamless service continuity for a UE moving between a long-term evolution (LTE) system and the NR system, inter-system mobility between the two systems is an issue to be solved.

SUMMARY OF THE INVENTION

The present invention therefore provides a communication device for handling a NR connection in inter-system mobility to solve the abovementioned problem.

A NR network for handling mobility for a communication device from the NR radio network to a LTE network comprises a storage device for storing instructions and a processing circuit coupled to the storage device. The processing circuit is configured to execute the instructions stored in the storage device. The instructions comprise connecting to the communication device; communicating a NR connection identity (ID) identifying a NR connection with the communication device; communicating data of the NR connection with the communication device; receiving a context request message for the communication device from the LTE network; and transmitting a context response message comprising an evolved packet system (EPS) bearer context of the communication device to the LTE network, wherein the EPS bearer context comprises an EPS bearer identity and a first plurality of QoS parameters.

A NR network for handling mobility for a communication device from the NR radio network to a LTE network comprises a storage device for storing instructions and a processing circuit coupled to the storage device. The processing circuit is configured to execute the instructions stored in the storage device. The instructions comprise connecting to the communication device; communicating a NR connection ID identifying a NR connection with the communication device; communicating data of the NR connection with the communication device; transmitting a request message comprising an EPS bearer context to the LTE network for initiating a handover to the LTE network for the communication device, wherein the EPS bearer context comprises an EPS bearer identity and a first plurality of QoS parameters; receiving a response message from the LTE network, wherein the response message comprises a RRCConnectionReconfiguration message for handing over the communication device to the LTE network; and transmitting the RRCConnectionReconfiguration message to the communication device.

A communication device for handling mobility for a communication device from a NR radio network to a LTE network comprises a storage device for storing instructions and a processing circuit coupled to the storage device. The processing circuit is configured to execute the instructions stored in the storage device. The instructions comprise connecting to the NR network; communicating a first NR connection ID identifying a first NR connection with the NR network; communicating a first data of the first NR connection with the NR network; receiving a RRCConnectionReconfiguration message from the NR network, wherein the RRCConnectionReconfiguration message configures a first Radio Bearer (RB) associated to a first EPS bearer identity and the first EPS bearer identity is associated to the first NR connection ID; handing over to the LTE network according to the RRCConnectionReconfiguration message; and transmitting second data of the first NR connection on the first RB.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
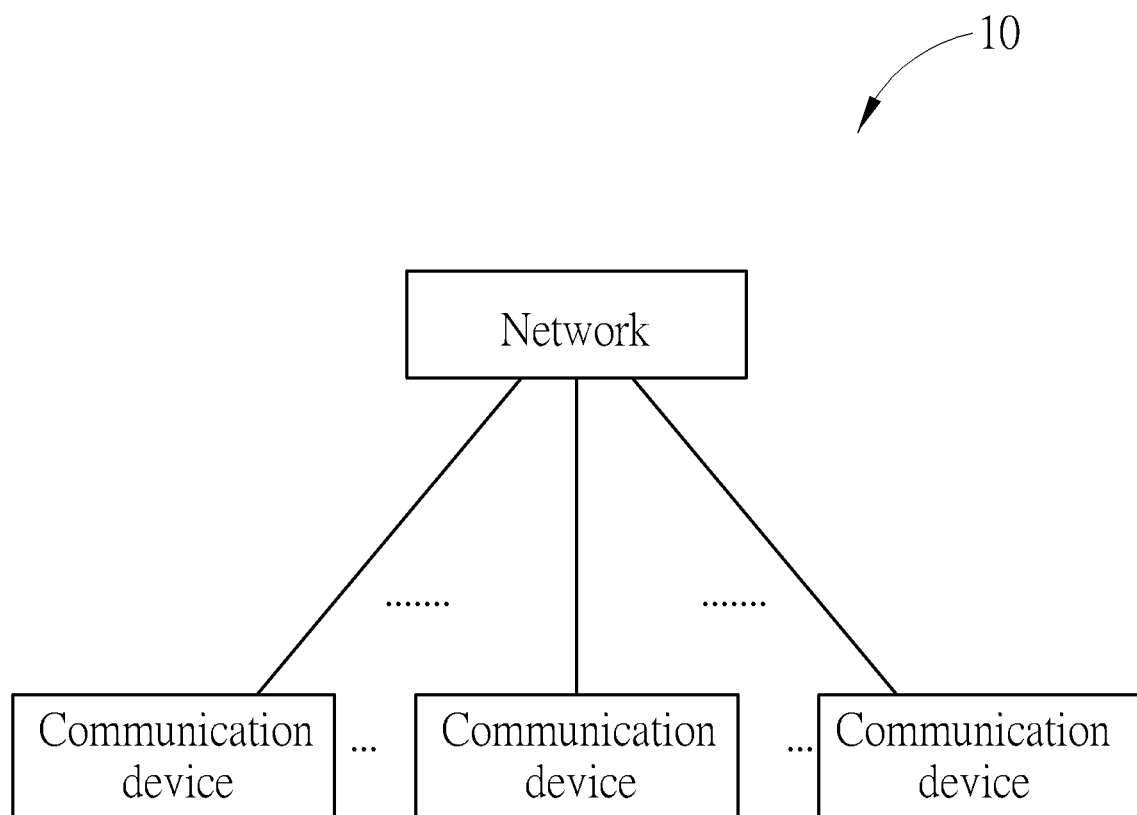
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers of licensed band(s) and/or unlicensed band(s).

In FIG. 1, the network and the communication devices are simply utilized for illustrating the structure of the wireless communication system 10. The network may comprise at least one of an evolved universal terrestrial radio access network (E-UTRAN) including at least one evolved Node-B (eNB) and a fifth generation (5G) network including at least one 5G BS. The 5G BS may employ orthogonal frequency-division multiplexing (OFDM) and/or non-OFDM (e.g., filtered OFDM (F-OFDM), Generalized Frequency Division Multiplexing (GFDM), Universal Filtered Multi-Carrier (UFMC) or Filter Back Multi-Carrier (FBMC)), and a transmission time interval (TTI) shorter than 1 ms (e.g. 100 or 200 microseconds). In general, a BS may also be used to refer any of the eNB and the 5G BS.

A communication device may be a user equipment (UE), a machine type communication (MTC) device, a mobile phone, a laptop, a tablet computer, an electronic book, a portable computer system, a vehicle, or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
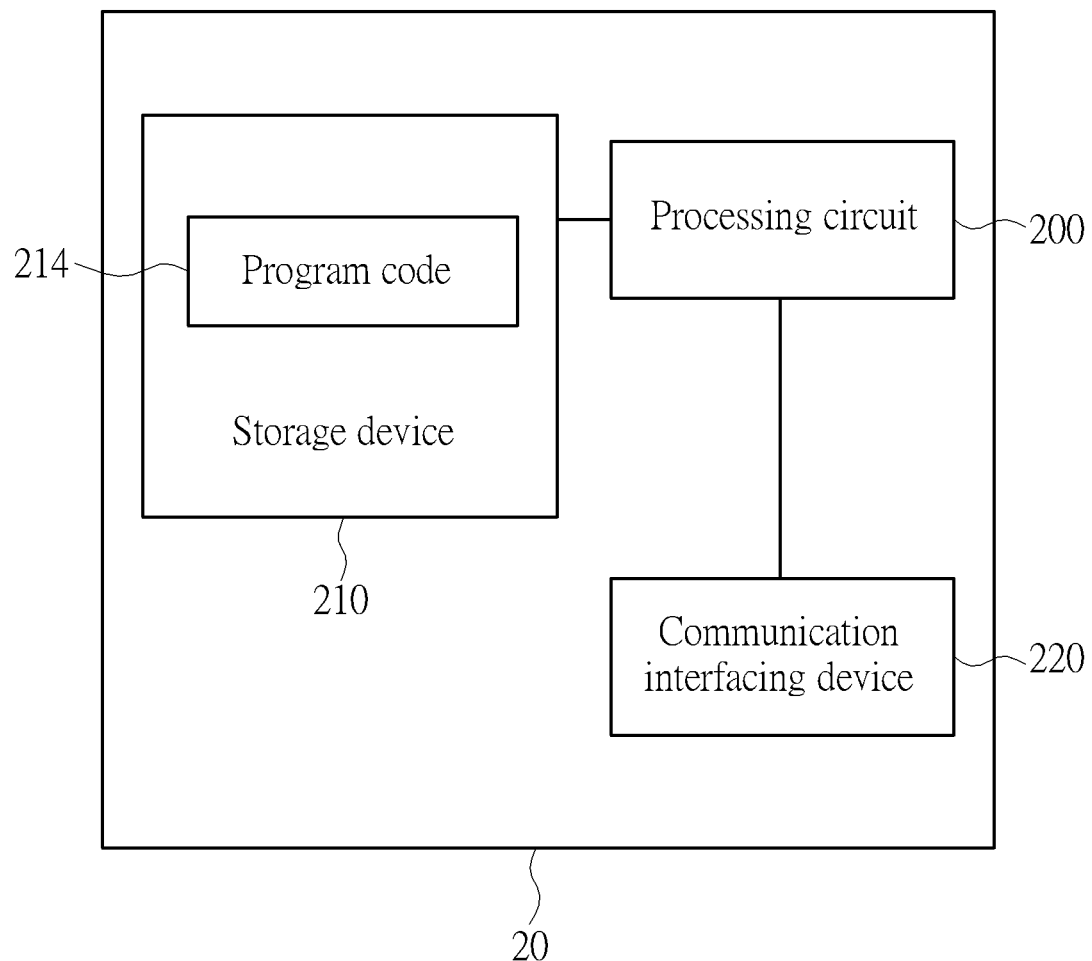
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing circuit 200 such as a microprocessor or Application Specific Integrated Circuit (ASCI), a storage device 210 and a communication interfacing device 220. The storage device 210 may be any data storage device that may store a program code 214, accessed and executed by the processing circuit 200. Examples of the storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The communication interfacing device 220 is preferably a transceiver and is used to transmit and receive signals (e.g., data, messages and/or packets) according to processing results of the processing circuit 200.

In the following embodiments, a UE is used to represent a communication device in FIG. 1, to simplify the illustration of the embodiments.

Figure 3:
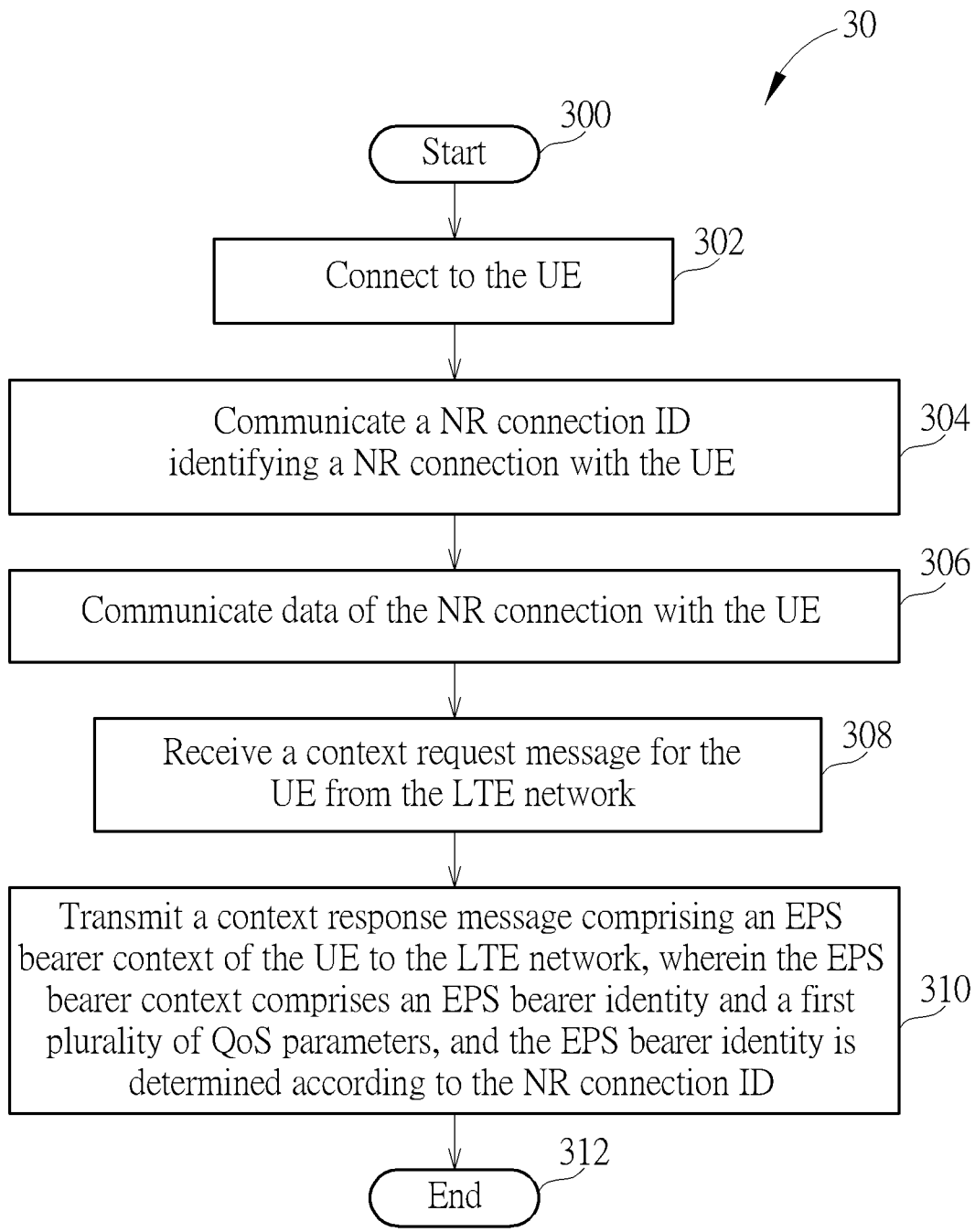
FIG. 3 is a flowchart of a process according to an example of the present invention.

FIG. 3 is a flowchart of a process 30 according to an example of the present invention. The process 30 can be utilized in a new radio (NR) network (e.g., the network in FIG. 1), for handling mobility for a UE from the NR network to a long-term evolution (LTE) network. The process 30 includes the following steps:

Step 300: Start.
Step 302: Connect to the UE.
Step 304: Communicate a NR connection identity (ID) identifying a NR connection with the UE.
Step 306: Communicate data of the NR connection with the UE.
Step 308: Receive a context request message for the UE from the LTE network.
Step 310: Transmit a context response message comprising an evolved packet system (EPS) bearer context of the UE to the LTE network, wherein the EPS bearer context comprises an EPS bearer identity and a first plurality of quality-of-service (QoS) parameters, and the EPS bearer identity is determined according to the NR connection ID.
Step 312: End.

The following examples may be applied to the process 30.

In one example, the NR connection ID comprises a protocol data unit (PDU) session ID or a QoS flow ID. In one example, the NR connection comprises a PDU session or a QoS flow.

In one example, the first plurality of QoS parameters comprise at least one of the QoS flow ID, the PDU session ID, a UL and DL maximum flow bit rate, an UL and DL guaranteed flow bit rate, a priority level, a packet delay budget, a packet error rate, an allocation and retention priority (ARP) and a notification control.

In one example, the NR network generates (e.g., derives, converts to or maps to) the first plurality of QoS parameters in the EPS bearer context according to a second plurality of QoS parameters associated to the NR connection. The LTE network may transmit the context request message to the NR network, when the LTE network receives a tracking area update request message from the UE. After the LTE network receives the context response message, the LTE network may transmit a tracking area update accept message to the UE. Thus, the LTE network may configure an EPS bearer to the UE according to the EPS bearer context (e.g., when the LTE network receives a service request message from the UE). The UE and the LTE network may transmit (or receive) data via the EPS bearer. The LTE network may configure the EPS bearer identity and a data radio bearer (RB) associated to the EPS bearer identity to the UE. The NR network may release a context of the UE including the EPS bearer context in response to the context request message.

Figure 4:
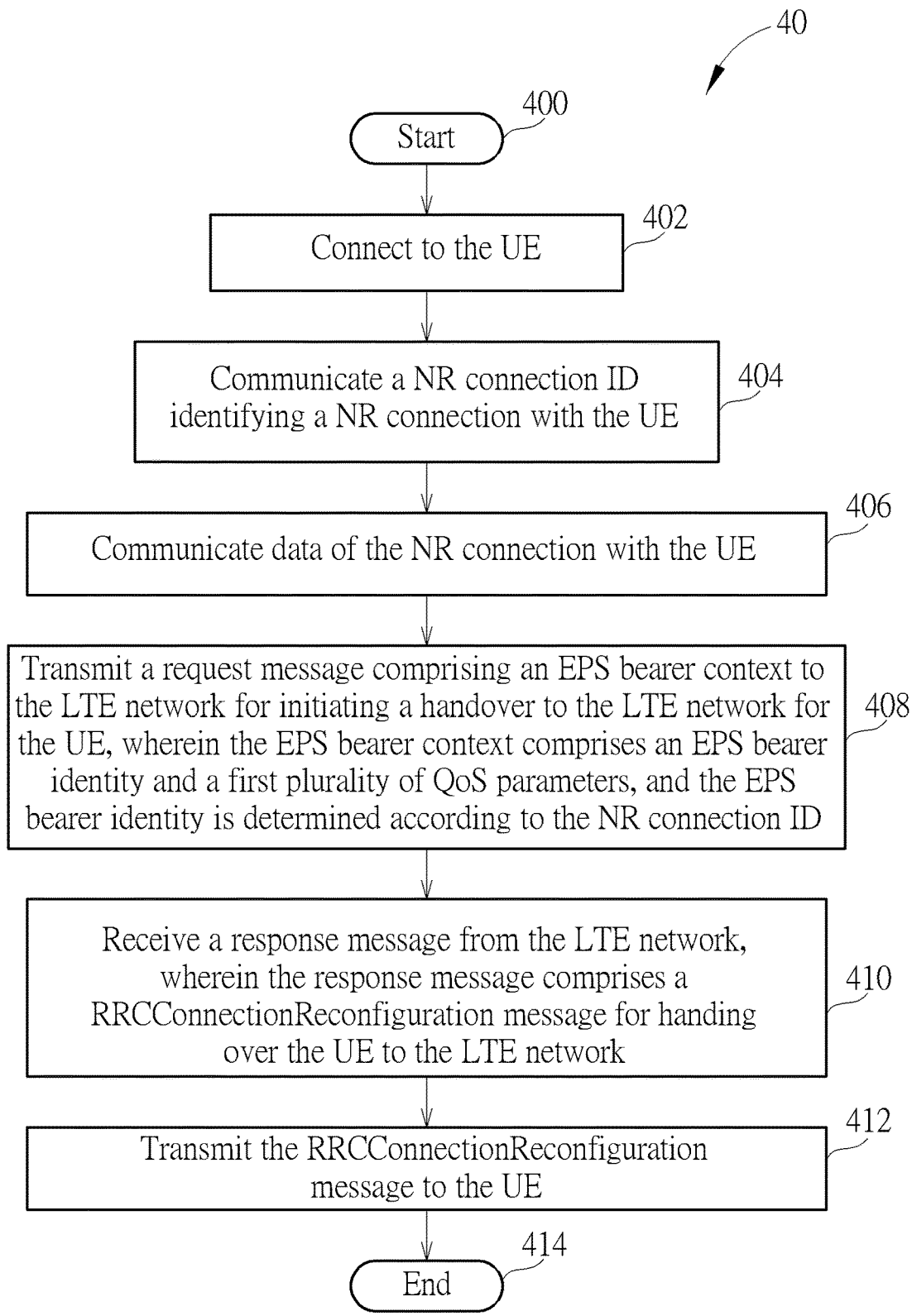
FIG. 4 is a flowchart of a process according to an example of the present invention.

FIG. 4 is a flowchart of a process 40 according to an example of the present invention. The process 40 can be utilized in a new radio (NR) network (e.g., the network in FIG. 1), for handling mobility for a UE from the NR network to a LTE network. The process 40 includes the following steps:

Step 400: Start.
Step 402: Connect to the UE.
Step 404: Communicate a NR connection ID identifying a NR connection with the UE.
Step 406: Communicate data of the NR connection with the UE.
Step 408: Transmit a request message comprising an EPS bearer context to the LTE network for initiating a handover to the LTE network for the UE, wherein the EPS bearer context comprises an EPS bearer identity and a first plurality of QoS parameters, and the EPS bearer identity is determined according to the NR connection ID.
Step 410: Receive a response message from the LTE network, wherein the response message comprises a RRC-ConnectionReconfiguration message for handing over the UE to the LTE network.
Step 412: Transmit the RRCConnectionReconfiguration message to the UE.
Step 414: End.

The following examples may be applied to the process 40.

In one example, the NR connection ID comprises a PDU session ID or a QoS flow ID. In one example, the NR connection comprises a PDU session or a QoS flow.

In one example, the request message is a handover request message, and the response message is a handover request acknowledge message.

In one example, the NR network generates (e.g., derives, converts to, or maps to) the first plurality of QoS parameters in the EPS bearer context according to a second plurality of QoS parameters associated to the NR connection. The NR network may transmit the request message to the LTE network. The LTE network may generate the RRCConnectionReconfiguration message in response to the request message. Thus, the LTE network may configure an EPS bearer to the UE according to the EPS bearer context. The UE and the LTE network may transmit or receive a data via the EPS bearer. The LTE network may configure the EPS bearer identity and a RB associated to the EPS bearer identity to the UE. That is, the RRCConnectionReconfiguration message includes a RB configuration (e.g., DRB-ToAddMod) which configures the RB and includes the EPS bearer identity.

In one example, in response to the RRCConnectionReconfiguration message received from the NR system, the UE performs a handover to the LTE network. When the UE successfully connects to the LTE network, the UE transmits an RRCConnectionReconfigurationComplete message to the LTE network. In response to the RRCConnectionReconfigurationComplete message, the LTE network transmits a notification message to the NR network. Thus, the NR network knows that the UE has successfully completed the handover to the LTE network, and releases a context of the UE when receiving the notification message. The context of the UE may include the QoS parameters associated to the NR connection and the NR connection ID. The context may include at least one of a temporary UE identity and a security configuration (e.g., a security key, a security algorithm, etc.).

Figure 5:
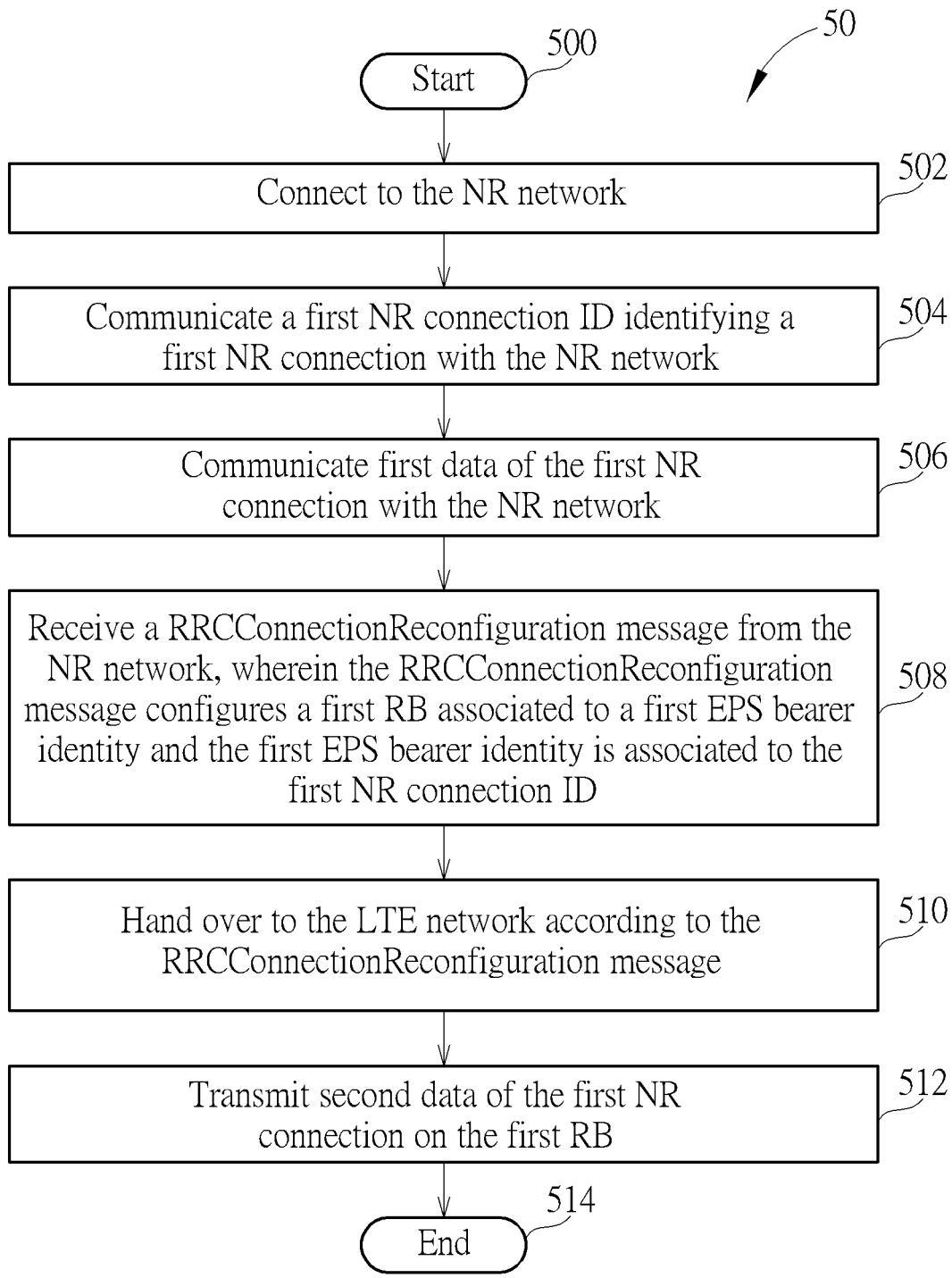
FIG. 5 is a flowchart of a process according to an example of the present invention.

FIG. 5 is a flowchart of a process 50 according to an example of the present invention. The process 50 can be utilized in a UE, for handling for a UE mobility from a NR network to a LTE network. The process 50 includes the following steps:

Step 500: Start.
Step 502: Connect to the NR network.
Step 504: Communicate a first NR connection ID identifying a first NR connection with the NR network.
Step 506: Communicate first data of the first NR connection with the NR network.
Step 508: Receive a RRCConnectionReconfiguration message from the NR network, wherein the RRCConnectionReconfiguration message configures a first RB associated to a first EPS bearer identity and the first EPS bearer identity is associated to the first NR connection ID.
Step 510: Hand over to the LTE network according to the RRCConnectionReconfiguration message.
Step 512: Transmit second data of the first NR connection on the first RB.
Step 514: End.

The following examples may be applied to the process 50.

In one example, the NR connection ID comprises a PDU session ID or a QoS flow ID. In one example, the NR connection comprises a PDU session or a QoS flow.

In one example, the first EPS bearer identity is set to the first NR connection ID. That is, the RRCConnectionReconfiguration message includes a first RB configuration (e.g., DRB-ToAddMod) which configures the first RB and includes the first EPS bearer identity which is the same as the first NR connection ID. The LTE network also transmits data of the first NR connection on the first RB to the UE. In one example, the first EPS bearer identity is mapped to (or derived from) the first NR connection ID as described above, and is not narrated herein. That is, when the UE determines that the first EPS bearer identity is mapped to the NR connection ID, the UE transmits data of the NR connection on the first RB.

In one example, the RRCConnectionReconfiguration message configures a second RB not associated to the first EPS bearer identity. In one example, the second RB is a signaling RB. In one example, the RRCConnectionReconfiguration message configures a third RB associated to a second EPS bearer identity set to a second NR connection ID identifying a second NR connection. In this case, the UE transmits data of the second NR connection ID on the third RB to the LTE network. The LTE network transmits a data of the second NR connection ID on the third RB to the UE.

Figure 6:
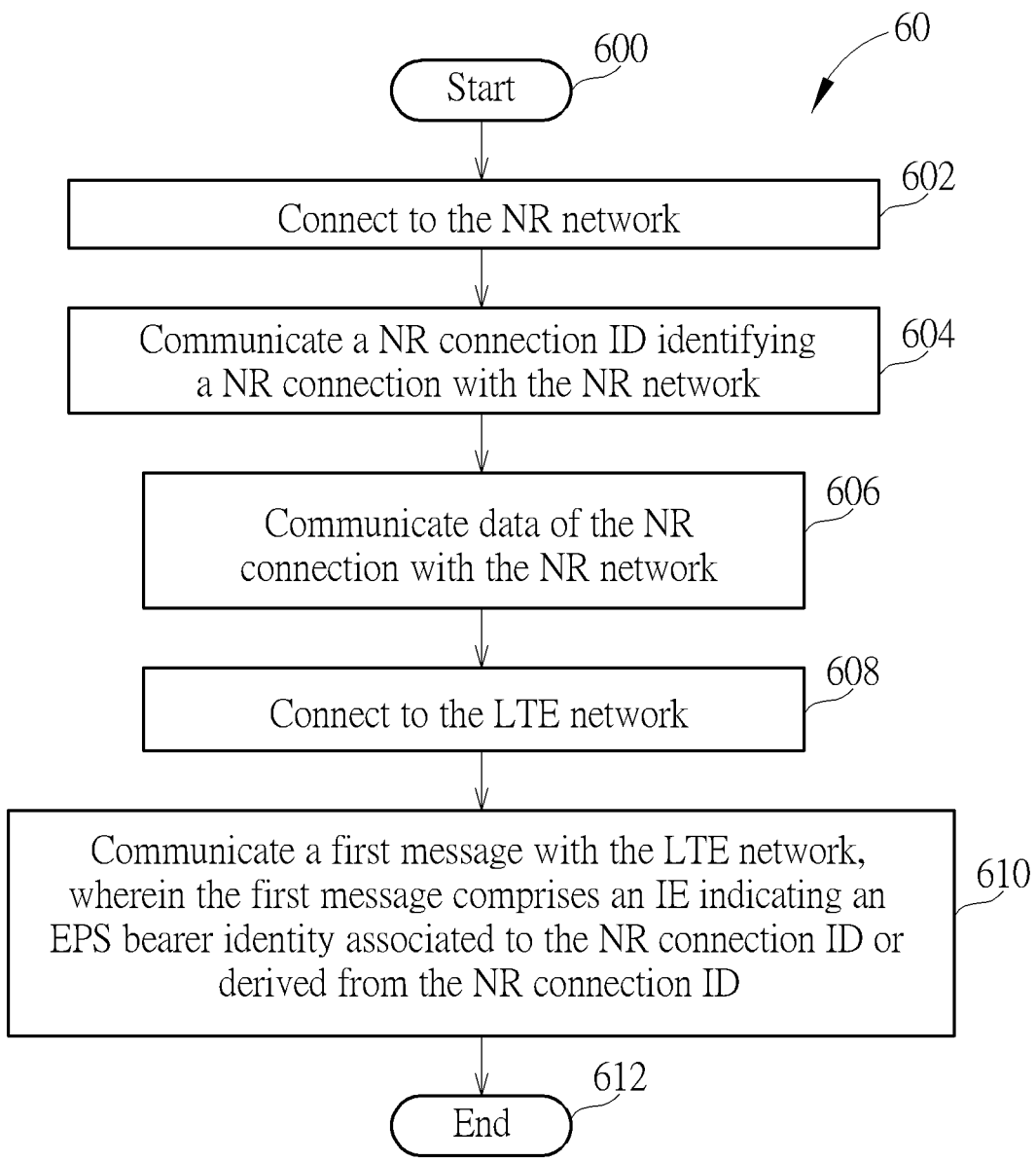
FIG. 6 is a flowchart of a process according to an example of the present invention.

FIG. 6 is a flowchart of a process 60 according to an example of the present invention. The process 60 can be utilized in a UE, for handling mobility for a UE from a NR network to a LTE network. The process 60 includes the following steps:

Step 600: Start.
Step 602: Connect to the NR network.
Step 604: Communicate a NR connection ID identifying a NR connection with the NR network.
Step 606: Communicate data of the NR connection with the NR network.
Step 608: Connect to the LTE network.
Step 610: Communicate a first message with the LTE network, wherein the first message comprises an information element (IE) indicating an EPS bearer identity associated to the NR connection ID or derived from the NR connection ID.
Step 612: End.

The following examples may be applied to the process 60.

In one example, the first message is a radio resource control (RRC) message or a Non-Access Stratum (NAS) message.

In one example, the NR connection ID comprises a PDU session ID or a QoS flow ID. In one example, the NR connection comprises a PDU session or a QoS flow.

In one example, the UE derives (e.g., determines, maps to, generates or converts to) the EPS bearer identity by determining the EPS bearer identity is the NR connection ID. In one example, the UE derives (e.g., determines, maps to, generates or converts to) the EPS bearer identity from the NR connection ID by a math operation. For example, the EPS bearer identity equals to the NR connection ID minus N, wherein N is a fixed value. For example, the EPS bearer identity equals to the NR connection ID plus N, wherein N is a fixed value. N may be configured by the NR network, or may be predetermined (e.g., described) in a standard specification.

In one example, the IE includes the NR connection ID. In one example, the IE includes a bit and a position of the bit indicating the NR connection ID.

In one example, the UE connects to a first BS of the NR network. The UE communicates (e.g., transmits or receives) a second message including a NR connection ID identifying a NR connection with (e.g., to or from) the NR network. The UE communicates (e.g., transmits or receives) data of the NR connection with (e.g., to or from) the first BS of the NR network. Then, the UE connects to the LTE network due to a handover or a cell selection (or reselection) to a cell of the LTE network. In case of the handover, the UE receives a handover command message from the first BS. The first message may be the handover command message. The handover command message (e.g., RRCConnectionReconfiguration) configures the UE to hand over to the cell of the LTE network. The UE connects to the cell (controlled by a second BS) of the LTE network.

In one example, the NAS message is an evolved packet system (EPS) mobility management (EMM) message. The EMM message is a service request message or a tracking area update request message. The IE is an EPS bearer context status IE in the EMM message. When the LTE network receives the EPS bearer identity in the EMM message, the LTE network maintains (e.g., keeps) an EPS bearer context identified by the EPS bearer identity for the UE. The LTE network either receives the EPS bearer context for the UE from the NR network or generates (e.g., derives, converts to or maps to) the EPS bearer context from a plurality of QoS parameters associated to the NR connection. In one example, the LTE network receives an EPS bearer identity set by the NR network to the NR connection ID or derived by the NR network from the NR connection ID, from the NR network. The NR network may derive the EPS bearer identity as the UE as described above. In one example, the LTE network receives the NR connection ID from the NR network, and derives the EPS bearer identity from the NR connection ID as the UE described above.

In one example, the first plurality of QoS parameters comprise at least one of the QoS flow ID (or the PDU session ID), a UL and DL maximum flow bit rate, an UL and DL guaranteed flow bit rate, a priority level, a packet delay budget, a packet error rate, an ARP and a notification control.

In one example, the NAS message is an EPS session management (ESM) message. The ESM message may be an activate dedicated EPS bearer context request message, a bearer resource allocation request message, a bearer resource modification request message, a deactivated EPS bearer context request, a deactivate EPS bearer context accept message, a modify EPS bearer context request message, a modify EPS bearer context reject message, a modify EPS bearer context accept message, a Packet Data Network (PDN) disconnect request message, an ESM information request message or an ESM information response message. When the UE or the LTE network receives the EPS bearer identity in the ESM message, the UE or the LTE network may operate the EPS bearer context identified by the EPS bearer identity according to a purpose of the ESM message. In one example, the UE transmits the bearer resource modification request message including the EPS bearer identity to the LTE network to request a release of the EPS bearer context. The LTE network may transmit the deactivate EPS bearer context request message including the EPS bearer identity in response to the bearer resource modification request message.

Figure 7:
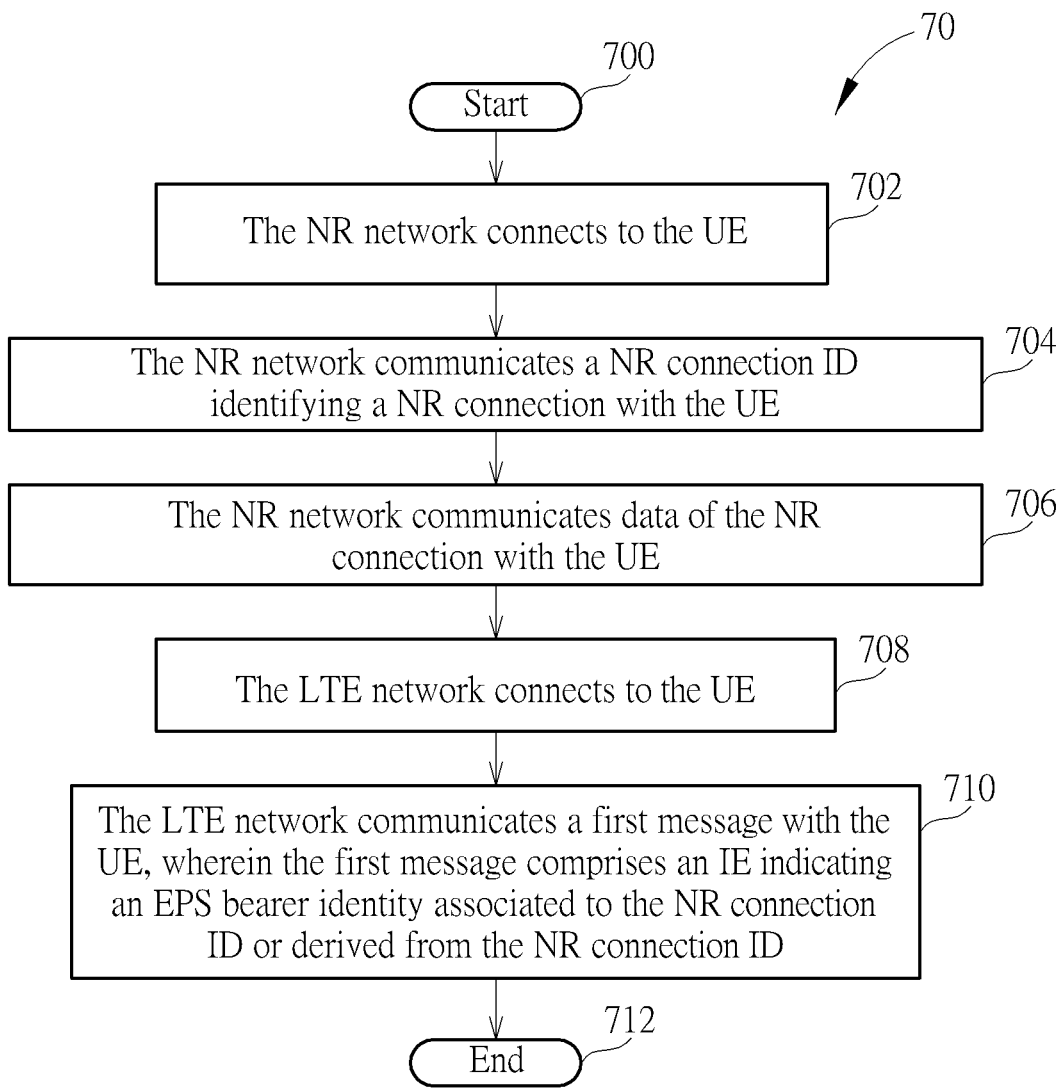
FIG. 7 is a flowchart of a process according to an example of the present invention.

FIG. 7 is a flowchart of a process 70 according to an example of the present invention. The process 70 can be utilized in a network including a NR network and a LTE network, for handling mobility for a UE from the NR network to the LTE network. The process 70 includes the following steps:

Step 700: Start.

Step 702: The NR network connects to the UE.

Step 704: The NR network communicates a NR connection ID identifying a NR connection with the UE.

Step 706: The NR network communicates data of the NR connection with the UE.

Step 708: The LTE network connects to the UE.

Step 710: The LTE network communicates a first message with the UE, wherein the first message comprises an IE indicating an EPS bearer identity associated to the NR connection ID or derived from the NR connection ID.

Step 712: End.

The process 70 corresponds to the NR network and the LTE network in the process 60. The description for the process 60 may be applied to the process 70, and is not narrated herein.

Figure 8:
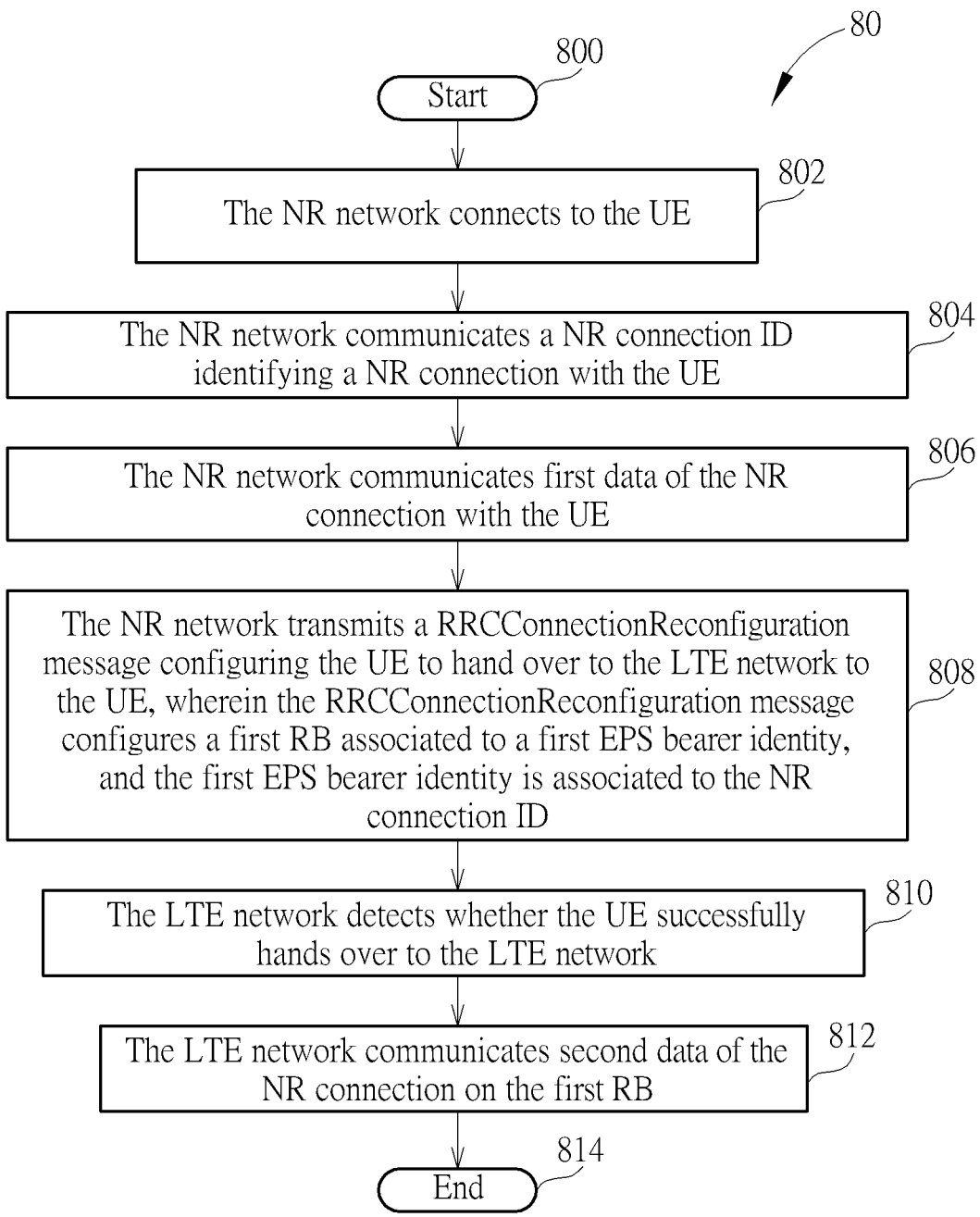
FIG. 8 is a flowchart of a process according to an example of the present invention.

FIG. 8 is a flowchart of a process 80 according to an example of the present invention. The process 80 can be utilized in a network including a NR network and a LTE network, for handling mobility for a UE from the NR network to the LTE network. The process 80 includes the following steps:

Step 800: Start.

Step 802: The NR network connects to the UE.

Step 804: The NR network communicates a NR connection ID identifying a NR connection with the UE.

Step 806: The NR network communicates first data of the NR connection with the UE.

Step 808: The NR network transmits a RRCConnectionReconfiguration message configuring the UE to hand over to the LTE network to the UE, wherein the RRCConnectionReconfiguration message configures a first RB associated to a first EPS bearer identity, and the first EPS bearer identity is associated to the NR connection ID.

Step 810: The LTE network detects whether the UE successfully hands over to the LTE network.

Step 812: The LTE network communicates second data of the NR connection on the first RB.

Step 814: End.

Realization of the processes 30-80 is not limited to the above description. The following examples can be applied to the processes 30-80.

In one example, "communicate" comprise "transmit" or "receive". The data of the NR connection may comprise data for the NR connection or data associated to the NR connection. In one example, when the UE connects to the NR network, the NR network transmits a NR RRC message configuring the NR connection ID and a RB configuration, to the UE. The RB configuration may configure a RB. The UE may communicate (e.g., transmits or receives) the data of the NR connection on the RB.

In one example, the PDU session includes at least one QoS flow identified by a flow ID. The QoS flow may be a PDU flow, an IP flow or a non-IP flow. An association between the NR connection ID and the EPS bearer identity may be predetermined (e.g., described in a standard specification).

In one example, the UE includes the NR connection ID in a NR session management (SM) message transmitted to the NR network. The network may include the NR connection ID in a NR SM message transmitted to the UE. In one example, the UE includes the NR connection ID in an Activate PDU Session Request message. The NR network may include the NR connection ID in the NG2 Request message.

In one example, the NR network includes a NR connection ID in a first RRC Connection Reconfiguration message transmitted to the UE. Thus, the UE knows that the NR network configures the radio resources for communicating the data of the NR connection according to the NR connection ID, when the UE receives the first RRCConnectionReconfiguration message. The UE and the NR network communicate (e.g., transmit or receive) the data of the NR connection according to the radio resources. The radio resources may include a RB configuration, a physical layer configuration or a medium access control (MAC) layer configuration. The RB configuration may include at least one of a radio link control (RLC) configuration, a logical channel identity and a logical channel priority.

In one example, the UE includes a PDU session ID in the Activate PDU Session Request message to establish a PDU session. The NR network may include the PDU session ID in the activate PDU session accept message in response to the Activate PDU session request message. The QoS flow may be associated to the PDU session. The activate PDU session accept message may include or does not include the flow ID.

In one example, after establishing the PDU session, the UE requests to setup a QoS flow to transmit the data of the QoS flow by transmitting a first NR SM message to the NR network. The first NR SM message may include a flow ID for identifying the QoS flow. In one example, the first NR SM message is a QoS flow resource allocation request message. The NR network transmits a second NR SM message (e.g., an activate QoS flow request message) to the UE in response to the NR SM message. The second NR SM message may include the other flow ID. The NR network may include the other flow ID in a second RRCConnectionReconfiguration message transmitted to the UE. Thus, the UE knows that the NR network configures the radio resources for communicating data of the other QoS flow when the UE receives the second RRCConnectionReconfiguration message.

In one example, the data of the NR connection includes a plurality of Internet Protocol (IP) packets associated to the NR connection. In one example, the data of the NR connection includes a plurality of PDUs and each PDU of the plurality of PDUs includes a packet of the QoS flow. Each PDU of the plurality of PDUs may include the QoS flow ID. In one example, the PDU is a Packet Data convergence Protocol (PDCP) PDU.

In one example, the UE and the NR network generate (e.g., determine, derive, map to or convert to) the EPS bearer identity from the NR connection ID. In one example, the UE may receive the EPS bearer identity in a NR message from the NR network. The NR message may be a NAS message (e.g., NR SM message) or a RRC message.

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program code 214.

To sum up, the present invention provides a method and a communication device for handling mobility for a UE from the NR radio network to the LTE network. The seamless service continuity for the UE can be provided and the uncertainty of the unlicensed band can be overcome. Thus, the problem of the art is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A new radio (NR) network for handling mobility for a communication device from the NR radio network to a long-term evolution (LTE) network, comprising:
a storage device; and
a processing circuit, coupled to the storage device, wherein the storage device stores, and the processing circuit is configured to execute instructions of:
connecting to the communication device;
communicating a NR connection identity (ID) identifying a NR connection with the communication device;
communicating data of the NR connection with the communication device;
receiving a context request message for the communication device from the LTE network; and
transmitting a context response message comprising an evolved packet system (EPS) bearer context of the communication device to the LTE network, wherein the EPS bearer context comprises an EPS bearer identity and a first plurality of quality-of-service (QoS) parameters;
wherein the EPS bearer identity is determined according to the NR connection ID.

2. The NR network of claim 1, wherein the NR connection ID comprises a protocol data unit (PDU) session ID or a QoS flow ID, and the NR connection comprises a PDU session or a QoS flow.

3. The NR network of claim 1, wherein the instructions further comprise:
generating the first plurality of QoS parameters in the EPS bearer context according to a second plurality of QoS parameters associated to the NR connection.

4. A new radio (NR) network for handling mobility for a communication device from the NR radio network to a long-term evolution (LTE) network, comprising:
a storage device; and
a processing circuit, coupled to the storage device, wherein the storage device stores, and the processing circuit is configured to execute instructions of:
connecting to the communication device;
communicating a NR connection identity (ID) identifying a NR connection with the communication device;
communicating data of the NR connection with the communication device;
transmitting a request message comprising an evolved packet system (EPS) bearer context to the LTE network for initiating a handover for the communication device to the LTE network, wherein the EPS bearer context comprises an EPS bearer identity and a first plurality of quality-of-service (QoS) parameters;
receiving a response message from the LTE network, wherein the response message comprises a RRCConnectionReconfiguration message for handing over the communication device to the LTE network; and
transmitting the RRCConnectionReconfiguration message to the communication device;
wherein the EPS bearer identity is determined according to the NR connection ID.

5. The NR network of claim 4, wherein the NR connection ID comprises a protocol data unit (PDU) session ID or a QoS flow ID, and the NR connection comprises a PDU session or a QoS flow.

6. The NR network of claim 4, wherein the request message is a handover request message, and the response message is a handover request acknowledge message.

7. The NR network of claim 4, wherein the instructions further comprise:
generating the first QoS parameters in the EPS bearer context according to a second plurality of QoS parameters associated to the NR connection.

8. A communication device for handling mobility from a new radio (NR) network to a long-term evolution (LTE) network, comprising:
a storage device; and
a processing circuit, coupled to the storage device, wherein the storage device stores, and the processing circuit is configured to execute instructions of:
connecting to the NR network;
communicating a first NR connection identity (ID) identifying a first NR connection with the NR network;

communicating first data of the first NR connection with the NR network;

receiving a RRCConnectionReconfiguration message from the NR network, wherein the RRCConnectionReconfiguration message configures a first radio bearer (RB) associated to a first evolved packet system (EPS) bearer identity and the first EPS bearer identity is associated to the first NR connection ID;

handing over to the LTE network according to the RRCConnectionReconfiguration message; and transmitting second data of the first NR connection on the first RB.

9. The communication device of claim 8, wherein the first NR connection ID comprises a protocol data unit (PDU) session ID or a QoS flow ID, and the NR connection comprises a PDU session or a QoS flow.

10. The communication device of claim 8, wherein the first EPS bearer identity is set to the first NR connection ID.

11. The communication device of claim 8, wherein the first EPS bearer identity is mapped to the first NR connection ID.

12. The communication device of claim 8, wherein the RRCConnectionReconfiguration message configures a second RB not associated to the first EPS bearer identity.

13. The communication device of claim 12, wherein the second RB is a signaling RB.

14. The communication device of claim 8, wherein the RRCConnectionReconfiguration message configures a third RB associated to a second EPS bearer identity which is set to a second NR connection ID identifying a second NR connection.

* * * * *